United States Patent [19]

Johnson et al.

[11] 3,726,550
[45] Apr. 10, 1973

[54] SLACK-FREE CONTAINER COUPLER

[76] Inventors: John Algot Johnson, 9 Sheridan Drive, Short Hills, N.J. 07078; Fred Muller, Jr., 120 Ridgedale Avenue, Florham Park, N.J. 07937

[22] Filed: Jan. 29, 1971

[21] Appl. No.: 110,965

[52] U.S. Cl.............287/2, 105/366 R, 287/20.5 R, 24/81 E
[51] Int. Cl.................................................F16b 7/00
[58] Field of Search..............................287/20.5, 2; 294/81 SF, 67 R; 105/366 R; 24/81 E, 221 R

[56] References Cited

UNITED STATES PATENTS

| | | |
|---|---|---|
| 3,609,824 | 10/1971 | Vanriet et al. ....................24/81 E |
| 2,972,175 | 2/1961 | Abolins.............................24/221 R |
| 3,261,070 | 7/1966 | Abolins.............................24/221 R |
| 3,052,941 | 9/1962 | Abolins.............................24/221 R |

*Primary Examiner*—Andrew V. Kundrat
*Attorney*—Howard I. Podell

[57] ABSTRACT

This invention pertains to an improved slack-free coupler for joining the corner fittings of freight containers to form a rigid connection, with the coupler carrying all the forces between the joined containers. The tension member of the coupler is of unitary construction, and the associated collars around it are wedged against the container fittings by means of a screw driven wedge-shaped yoke to maintain a tight fit between the containers despite the tolerance of spacing of adjacent container corner fittings.

5 Claims, 25 Drawing Figures

PATENTED APR 10 1973

John Algot Johnson
Fred Muller, Jr.  INVENTORS

BY  Howard I. Padell  AGENT

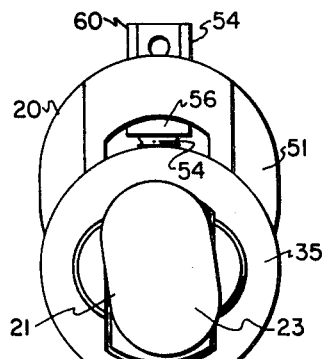
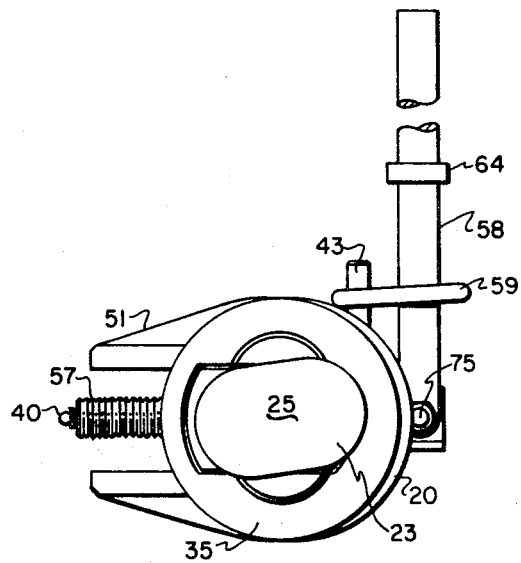
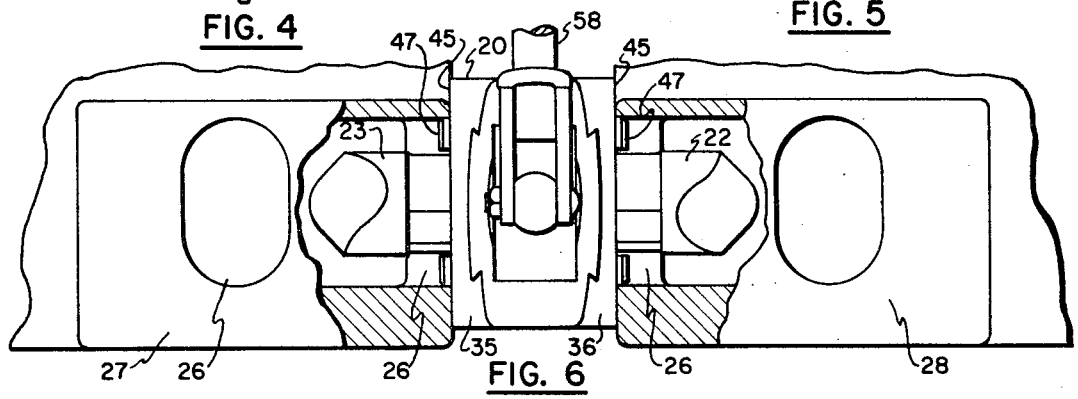
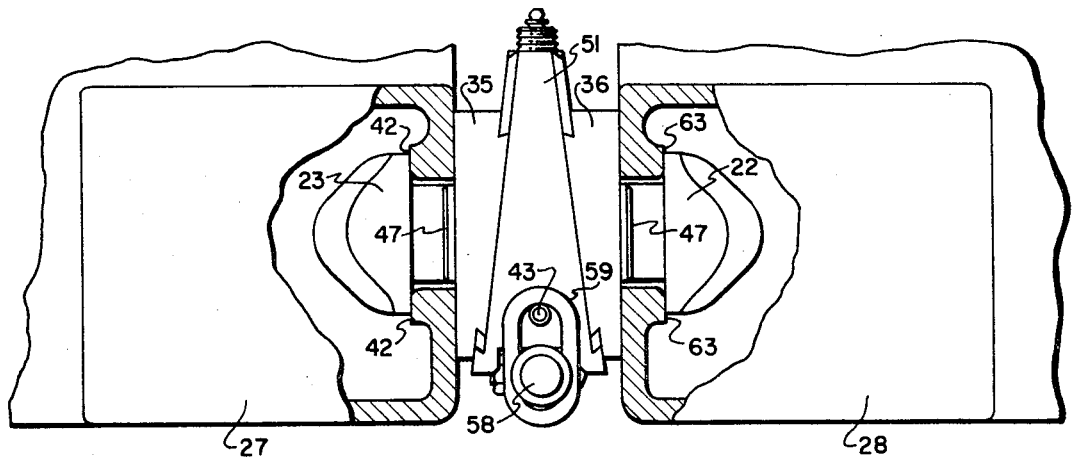

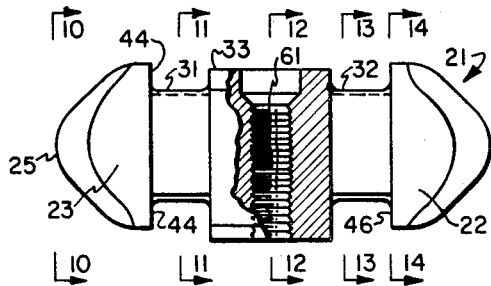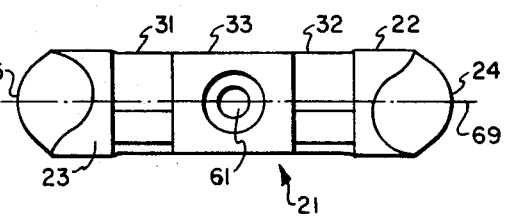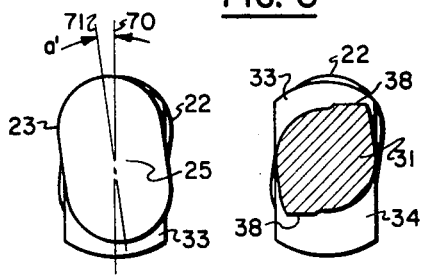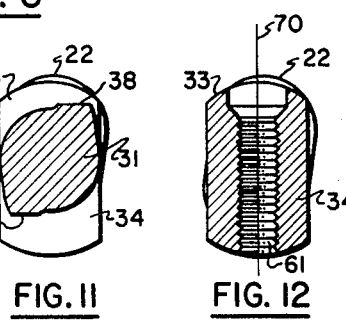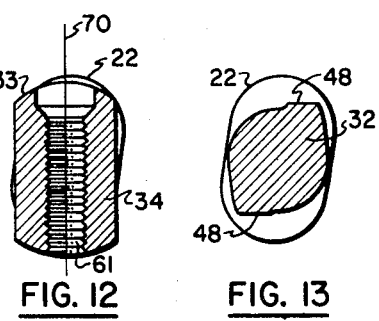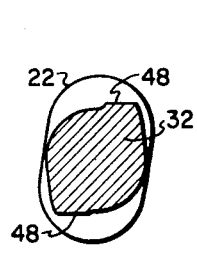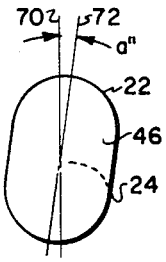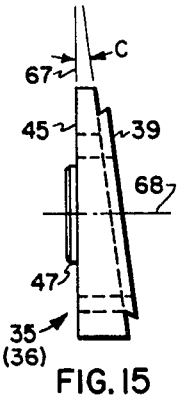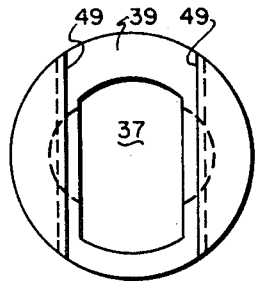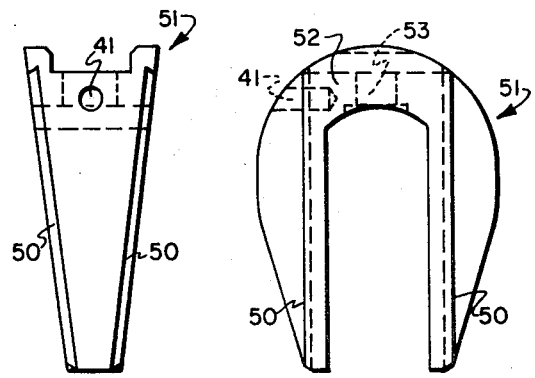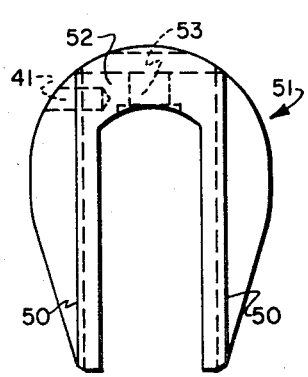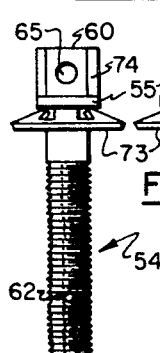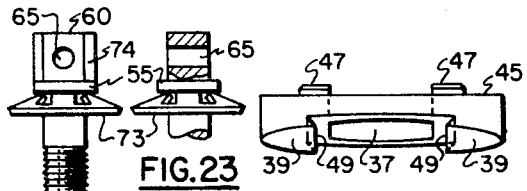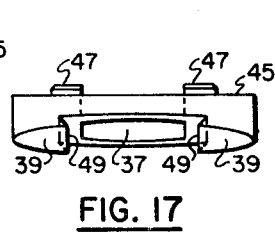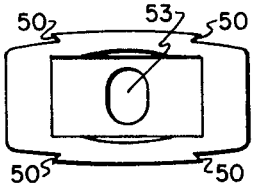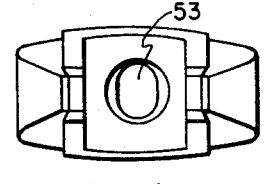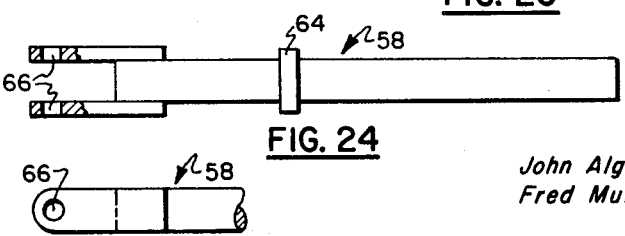

SLACK-FREE CONTAINER COUPLER

BACKGROUND OF THE INVENTION

This invention pertains to an improved means of joining two or more containers together into one unitary structure by means of an improved slack-free coupler which locks into the corner fittings of the containers. Two freight containers when so coupled together can be handled as one unit when hoisted by a crane into a container ship, during shipboard movement or when trucked over the road. When two containers are so coupled together, no additional frame is required for support and the fitting of a king-pin fifth wheel to the forward container and the mounting of one or more conventional bogies under the rear container of the equivalent chassis converts the coupled unit to an over-the-road semi-trailer.

The coupled unit is as readily disassembled into individual containers for storage or unloading by the removal of the coupling means.

The corner fittings of present day freight containers are designed to meet International Standards, particularly with respect to the dimensions of the openings in these fittings so as to accomodate the lifting and coupling devices employed.

In using conventional coupling devices, it has been found that the dimensional variations in the thickness of these corner fittings of one-sixteenth of an inch, which is permitted by these International Standards, prevent the existing coupling devices from creating a slack-free joint between the containers.

Coupling devices, to be effective, must carry loads between the containers in tension, compression, shear and torsion or any combination of loads that may be present.

For optimum strength in tension, the coupler member carrying the load in tension should be of unitary construction and therefore of fixed length, since any adjustment in length of this member would require a joint that would reduce the cross-section and therefore the tensile strength of the member.

In practice, where fixed length couplers have been employed, they have been unable to create a pre-stress of tension in the coupler necessary to secure a slack-free joint since the prior fixed-length couplers have provided no means for applying compression loads to both corner fittings over the variation of thickness of these corner fittings.

SUMMARY OF INVENTION

This invention pertains to a coupler for joining two or more freight containers and consists of a tension member with bosses on each end shaped to fit into the non-round aperatures of freight container corner fittings and to rotate behind the opening in the coupling position. Around the tension member, near its mid-section, are two compression collars or rings which can move axially on the tension member. Each collar may be shaped on its external face with protrusions which press into the aperatures of the freight container corner fittings.

The hole through these collars may be non-circular and only slightly larger than the similar non-circular cross-section of the tension member in the location where the collars are mounted on the tension member so as to prevent rotation of the collars about the tension member.

The inner faces of the collars are each at such an angle to the longitudinal axis of the tension member that a wedge shaped yoke between the collars acts to force the collars and the containers apart as the yoke is moved towards or away from the tension member by the action of rotating a screw. The screw may be rotationally held to the yoke and threaded into the tension member or held captive in the tension member and threaded to the yoke.

The containers will actually be moved away from each other by the compressive force thus exerted on the container corner fittings until the inside faces of the container corner fittings bear against the inside faces of the bosses of the tension member. Further compressive forces generated in the collars by the movement of the wedge shaped yoke will create a pre-stress of tension in the tension member of the coupler.

By this means, two or more containers can be coupled together at their corners to become a unitary structure with the coupler carrying all the necessary tension, compression, torsion and shear loads as well as moments between the the containers and with the coupler prestressed in tension and compression. The structure is improved by the tension member being preferably of unitary construction.

Rotating the screw with an attached handle or accessory wrench develops ample pre-stressed compression and tension loads in the coupler to maintain the tight connection between the containers, despite the tolerance of spacing of adjacent corner fittings to each other and the dimensional tolerances of the corner fittings themselves.

Two coupled standard 20 foot containers conventionally loaded to 33,600 pounds each, when hoisted from the ends, will generate a tension force in each coupler at the bottom corners of 22,600 pounds. Where the tension member of the coupler has not been pre-stressed to above 22,600 pounds at the time the joint was coupled, the tension load induced by the hoisting operation will stretch the coupler and result in a complete loss of any compressive force between the coupled containers. If, however, the coupler had been pre-stressed in tension in accordance with our teachings to at least 25,000 pounds by the application of 25,000 pounds of compressive load against the corner fittings of each container, at the time the containers were coupled together, the effect of the forces induced by the hoisting operation would result as follows:

| Force in Coupler | As Coupled | As Hoisted |
|---|---|---|
| PRIOR ART | | |
| TENSION | Nominal | 22,600 pounds |
| COMPRESSION | Nominal | Zero |
| THIS INVENTION | | |
| TENSION | 25,000 pounds | 25,000 pounds |
| COMPRESSION | 25,000 pounds | 2,400 pounds |

It can be seen that the effect of pre-stress in tension and compression in this invention results in a slack-free joint. Without increasing the tension load in service, the pre-stress maintains a tight coupled joint between the containers and minimizes the effects of those impact forces which are occasioned by the normal handling practices in highway, rail and marine transport operations.

While the following description and drawings illustrate the use of this coupler to join together freight containers, it will be understood by anyone familiar with the art that these couplers can be used to connect together any two or more structures, particularly where it is desirable to provide means for either simple disassembly of the connected structures or to join together such structures to form a strong connection, even one as strong as the separate structures.

Other objects and features of the invention will become apparent from the subsequent description taken together with the accompanying drawings of one form of the preferred embodiment and the appended claims.

BRIEF DESCRIPTION OF THE DRAWINGS

FIG. 4 is an end view of a coupler embodying the features of the present invention;

FIG. 5 is an optional form of the invention from the same end view as FIG. 4;

FIG. 6 is a view of the structure similar to FIG. 2 after the coupler has been rotated into the locked position and fully tightened;

FIG. 7 is a top sectional view of the structure illustrated in FIG. 6;

FIG. 8 is a side sectional view of the spindle of the structure;

FIG. 9 is a top view of the structure of FIG. 7;

FIG. 10 is an end view of the structure illustrated in FIG. 8 taken on the line 10—10 thereof;

FIG. 11 is an end sectional view of the structure illustrated in FIG. 8 taken on the line 11—11 thereof;

FIG. 12 is an end sectional view of the structure illustrated in FIG. 8 taken on the line 12—12 thereof;

FIG. 13 is an end sectional view of the structure illustrated in FIG. 8 taken on the line 13—13 thereof;

FIG. 14 is an end sectional view of the structure of FIG. 8 taken on the line 14—14 thereof;

FIG. 15 is a side view of one of the collars of the coupler;

FIG. 16 is an end view of the structure illustrated in FIG. 15;

FIG. 17 is a top view of the structure illustrated in FIG. 15;

FIG. 18 is a side view of the Yoke of the coupler;

FIG. 19 is an end view of the structure illustrated in FIG. 18;

FIG. 20 is a top view of the structure illustrated in FIG. 8;

FIG. 21 is a bottom view of the structure illustrated in FIG. 19;

FIG. 22 is a side view of the Screw of the coupler;

FIG. 23 is a sectional view of the head of the structure illustrated in FIG. 22;

FIG. 24 is a sectional view of an optional handle for rotating the Coupler Screw; and FIG. 25 is a side view of the structure illustrated in FIG. 24.

DESCRIPTION OF THE PREFERRED EMBODIMENT

Figure 1:
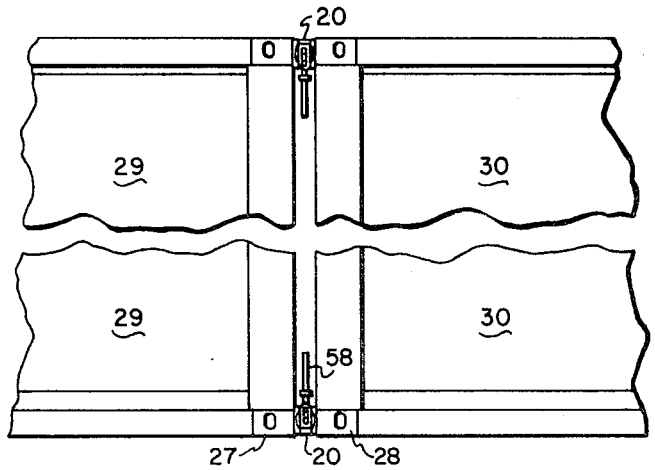
FIG. 1 is a side view showing two containers joined together by a coupler embodying the features of the present invention.
Figure 2:
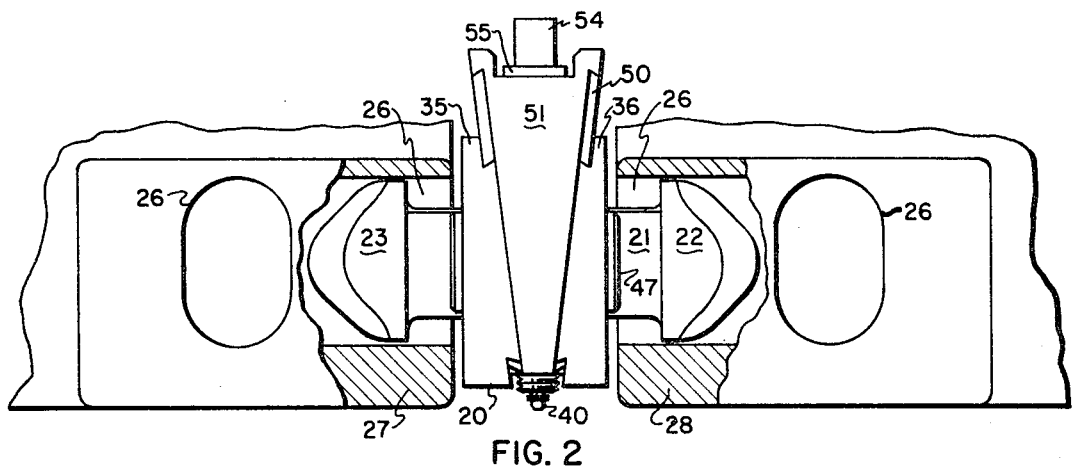
FIG. 2 is an enlarged section view of the structure illustrated in FIG. 1 when the coupler has been initially inserted into the corner fittings of the adjacent containers, prior to rotating the coupler into the locked position.
Figure 3:
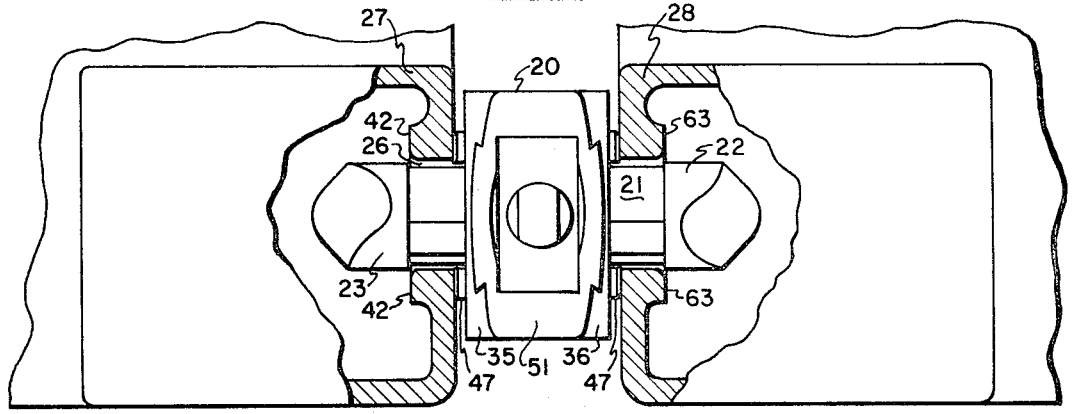
FIG. 3 is a top sectional view of FIG. 2.

The coupler 20 consists of a solid tension spindle 21, about which fit two compression collars 35 and 36 which are pushed apart or pulled together by the action of wedged yoke 51 when the screw 54 is rotated. As shown in FIGS. 8 and 9, the bosses 22 and 23 of the spindle 21 are externally shaped in a convex fashion coming to an elliptically shaped rounded nose 24 and 25 at each end so that they may readily fit into the oblong elliptical shaped recess 26 of the respective corner fittings 27 and 28 of the freight containers 29 and 30 as shown in FIGS. 1, 2 and 3.

The spindle cross-section 31 and 32 is sharply reduced just inward of the nose sections 24 and 25 to a shaped cross-section as shown in FIGS. 11 and 13. Furthermore, the oblong axis 71 of the nose section 23 of one end of spindle 21 is axially rotated by an angle $a'$ from the oblong axis 70 of the spindle as shown in FIG. 10, and the oblong axis 72 of the opposite nose section 22 is rotated in the opposite direction from the oblong axis 70 of the spindle by angle $a''$ as shown in FIG. 14. Angle $a'$ may be similar to angle $a''$ and preferably each angle should be at least 7°.

When the spindle 21 is inserted into one of the recesses 26 of the corner fitting 27 of a freight container 29 and manually rotated in the proper direction by the magnitude of the sum of the angles $a'$ and $a''$, it can no longer be withdrawn from that corner fitting 27 because the back face 44 of spindle boss 23 now engages the inside back surface 42 of the corner fitting 27. However, the opposite nose section 22 of spindle 21 is now lined up to receive the aperature 26 of the corner fitting 28 of the adjacent freight container 30. The second container 30 is pushed toward the first container 29 and nose section 22 enters the aperature 26 of the corner fitting 28. When fully engaged, spindle 21 is now rotated to the locking position by an angle, so that back face 46 of spindle boss 22 engages the inside back surface 63 of corner fitting 28. Preferably the sum of angles $a''$ and this angle should be in the order of 90°. Once the spindle 21 has been rotated by the extent of this angle, the spindle 21 is now fully engaged in both corner fittings of containers 29 and 30 and neither container can be pulled free of each other by tension forces.

The spindle 21 cannot rotate a greater extent than this angle because of the stops 38 and 48 in necks 31 and 32 respectively of the spindle 21. When rotated by the amount of this angle, stops 38 and 48 hit the sides of hole 26 in the corner fittings. Thus the spindle 21 cannot be rotated past the locking position inadvertently to a position where either boss 22 or 23 would be aligned with the aperature 26 and would consequently inadvertently uncouple. In order for the spindle 21 to be unlocked from either container corner fitting, spindle 21 must be rotated in the opposite direction, to the locking direction.

The mid-section of the spindle 21 has a non-round cross-section 34 as shown in FIG. 12 and contains at right angles to its longitudinal axis 69 and parallel to its oblong axis 70 a threaded hole 61. Fitting loosely over the mid-section 33 of the spindle 21 are two collars 35 and 36. FIGS. 15, 16 and 17 detail the features of collar 35 which are preferably identical to collar 36. Collars 35 and 36 are unable to rotate about the spindle because their non-round holes 37 respectively mate loosely with the non-round cross-section 34 of the spindle midsection 33. However, the collars are free to move axially along spindle 21 in conjunction with the action of yoke 51 which engages both collars 35 and 36 as further described.

The inner face 39 of collar 35 and 36 is at an angle c to the perpendicular 67 of the collar axis 68. The outer face 45 of each collar is perpendicular to the axis 68 of the collar and the axis 69 of the spindle 21. This outer face 45 of the collar may contain protrusions 47 to engage inside of the elliptical recesses 26 of the container corner fittings 27 and 28. When the collars are forced against the sides of the corner fittings, collar protrusions 47 fit into the recesses 26 of the corner fittings 27 and 28 and restrain any forces of rotation or forces of vertical or horizontal shear of the containers, since the collars cannot rotate relative to each other about the spindle axis 69, nor can the collars move at right angles to the spindle axis 69. FIGS. 2 and 3 illustrate the relation of the coupler to the corner fittings 27 and 28 prior to rotating the spindle and collars into the locking position while FIGS. 6 and 7 illustrate the relation after the spindle and collars have been rotated to the locking position and the collars 35 and 36 have been spread apart by yoke 51 so that the protrusions 47 now fit inside the recesses 26 of the corner fittings 27 and 28.

As shown in FIG. 16, each of the inner faces 39 of collars 35 and 36 is recessed with undercuts 49 parallel to the face 39. Separating the collars 35 and 36 and engaging in their undercut recesses 49 is tapered yoke 51 with mating undercuts 50 on both faces as shown in FIGS. 18 and 19. Yoke 51 acts to spread collars 35 and 36 away from each other as yoke 51 is advanced toward the spindle 21 and to pull collars 35 and 36 towards each other as the yoke 51 is moved away from the spindle 21.

Yoke 51 is preferably a U-shaped member. Through its mid-section 52 is a hole 53 which is elongated along the axis 69 of the spindle as shown in FIGS. 20 and 21. Screw 54, detailed in FIGS. 22 and 23 is fastened through hole 53 so that it is free to rotate but restrained from axial movement by bearing collars 55 and 56 which are fastened to screw 54 as shown in FIG. 22. Screw 54 is threaded at its lower end 57 and screws into threaded hole 61 of spindle 21. The outside end 60 of the screw 54 may optionally terminate in a handle 58 shown in FIGS. 24 and 25 for manually rotating screw 54, or the end 60 of screw 54 may be shaped to fit a wrench or other tool. An oil or grease fitting 40 is provided at the other end of screw 54 to permit lubricating the screw thread through port 62. Rotation of screw 54 results in moving yoke 51 away from or towards spindle 21 depending upon the direction rotated, and respectively moving collars 35 and 36 towards each other or apart.

It is to be noted that the tapers of collars 35 and 36 and yoke 51 may be varied so as to cause collars 35 and 36 to move towards each other when yoke 51 advances towards spindle 21, if such an effect is desirable.

Handle 58 is fastened by pin 75 to screw 54 through hole 65 in the screw and hole 66 in the handle. A collar 64 on handle 58 serves to prevent link 59 from being removed from handle 58 in the installed position as shown in FIG. 5. Link 59 serves to lock handle 58 to pin 43 fastened in hole 41 of yoke 51 so as to keep the handle from rotating after the screw 54 has been adjusted to its final position.

A spring washer 73 may be placed under head 74 of screw 54 as shown in FIG. 22 to provide additional pressure against yoke 51 and, consequently, pressure against collars 35 and 36 to compensate such stretch in tension member 21 as may occur under service loads on the containers 29 and 30 after they have been coupled.

Because the cross-section of the spindle 21 and its strength in tension are limited by the cross-section 31 which can rotate in the aperature 26 of the corner fittings 27 and 28, an important structural feature of this invention is the fact that the tension member, spindle 21, is of unitary or one-piece construction and the tension load limited by the dimensional requirements of the aperature size 26 are not further reduced in the tension member by the necessity for any joints in its structure. It is recognized that this same feature could be obtained if the spindle were of two or more longitudinal sections, but otherwise as described above, or if it were formed from separate sections that were permanently welded together.

From the foregoing description of the preferred embodiment it can be seen that this invention permits the ready coupling of two units such as cargo containers which are equipped with the matching fittings, and in the coupled mode, maintains the coupled units in fixed relation to each other with the coupler absorbing loads in compression, tension, shear and rotation between the coupled units. It can be readily understood by those skilled in the arts that this invention is susceptible to modification, variation and change without departing from the proper scope or fair meaning of the subjoined claims.

What is claimed is:

1. A coupler for joining two units together so as to maintain a slack-free pre-stressed joint between the units thus coupled together comprising:

a tension member with bosses on each end, both of said bosses being integral with the tension member so as to remain fixed relative to each other and to said tension member, said tension member being of fixed length and said bosses shaped to fit freely into the non-round openings of the fittings of the units to be coupled together and to rotate behind the inside faces of the non-round openings of the fittings when the tension member is rotated to the coupling position, a pair of compression members, slidable axially in relation to said tension member so as to exert a compressive force against the outer faces of the fittings of the units to be coupled when the compression members are spread apart, means to rotate the tension member into the coupling position in the fittings of the units to be coupled when the compression members are drawn together and are free of compressive force or frictional force against the outer faces of the fittings of the units to be coupled, means responsive to the rotation of a screw to permit the compression members to be drawn together, and upon reverse rotation of the said screw, said means acting to spread the compression members apart whereby said compression members are forced against the outer faces of the fittings of the units to be coupled and upon further rotation of the screw, force the inside faces of the fittings of the coupled units against the bosses of the tension member when the tension member is in the coupling position, said means upon further continued rotation of the screw continuing to spread the compression members with the compression members and the tension member each restrained from rotation about the coupler axis by the frictional force of the respective mating faces of the fittings of the coupled units, creating a tension force in the tension member acting to keep the coupled units together, and a compressive force between the coupled units acting to keep the coupled units apart, wherein uncoupling of the coupled units is accomplished by the drawing together of the compression members with consequent relief of compression forces in the coupler by withdrawing the wedge shaped member from compressive engagement with the compression members, the bearing surfaces of the wedge shaped member and the compression members being of a slidable interlocked nature, said wedge shaped member being withdrawn by reverse rotation of its associated screw thus permitting the tension member to be rotated manually from the lock position to permit uncoupling of the coupled units.

2. In a coupler as recited in claim 1, wherein the tension member has means to limit the degree of rotation of the coupler in the fittings of the units being coupled such that when the tension member has once been rotated in the non-round openings of the coupled units into the coupling position, it cannot be further rotated past the coupling position, such that the coupler cannot be removed from the fittings of the coupled units without being rotated in the reverse direction.

3. In a coupler as recited in claim 1, wherein the tension member is of unitary construction consisting of one or more elements, each element carrying its own tension load from the faces of the fittings of the one coupled unit to the faces of the fittings of the other coupled unit, and each element being free of joints other than permanent welded joints.

4. In a coupler as recited in claim 1, wherein the radial axes of the cross-section of the bosses of the tension member are angularly offset with regard to each other so that the tension member must be rotated after the non-round boss on one end is inserted into the non-round hole of the fitting of the one unit to be coupled to align the non-round boss on the other end of the tension member with the non-round opening of the fitting of the second unit to be coupled, when the non-round openings of the fittings of the units to be coupled are of similar shape and similar axial alignment.

5. A coupler for joining two units together so as to maintain a slack-free pre-stressed joint between the units thus coupled together comprising:

a tension member with bosses on each end, both of said bosses being integral with the tension member so as to remain fixed relative to each other and to said tension member, said tension member being of fixed length and said bosses shaped to fit freely into the non-round openings of the fittings of the units to be coupled together and to rotate behind the inside faces of the non-round openings of the fittings when the tension member is rotated to the coupling position, a pair of compression members each coaxially mounted about the said tension member, said compression members slidable axially in relation to said tension member so as to exert a compressive force against the outer faces of the fittings of the units to be coupled when the compression members are spread apart, means to rotate the tension member into the coupling position in the fittings of the units to be coupled when the compression members are drawn together and are free of compressive force or frictional force against the outer faces of the fittings of the units to be coupled, yoke means straddling said tension member and responsive to the rotation of a screw about an axis transverse to the axis of said tension member to permit the compression members to be drawn together, and upon reverse rotation of the said screw, said means acting to spread the compression members apart whereby said compression members are forced against the outer faces of the fittings of the units to be coupled and upon further rotation of the screw, force the inside faces of the fittings of the coupled units against the bosses of the tension member when the tension member is in the coupling position, said means upon further continued rotation of the screw continuing to spread the compression members with the compression members and the tension member each restrained from rotation about the coupler axis by the frictional force of the respective mating faces of the fittings of the coupled units, creating a tension force in the tension member acting to keep the coupled units together, and a compressive force between the coupled units acting to keep the coupled units apart.

* * * * *